3,770,821
SUBSTITUTED β-ARYLAMIDOACRYLIC ACIDS
Robert Thomas Buckler, Edwardsburg, Mich., and Harold
 Eugene Hartzler, Elkhart, Ind., assignors to Miles Laboratories, Inc., Elkhart, Ind.
No Drawing. Filed Oct. 16, 1970, Ser. No. 81,622
Int. Cl. C07c 103/30
U.S. Cl. 260—518 R         27 Claims

ABSTRACT OF THE DISCLOSURE

Certain substituted β-arylamidoacrylic acids and a method of preparing them are disclosed. These compounds are useful as antiinflammatory and diuretic agents.

SUMMARY OF THE INVENTION

Compounds of the present invention correspond to the formula (A) 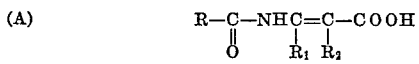

in which R is phenyl, halophenyl, loweralkylphenyl, cyanophenyl, loweralkoxyphenyl, diloweralkylaminophenyl or pyridyl; $R_1$ is loweralkyl or phenyl and $R_2$ is hydrogen or loweralkyl. The term "halophenyl" includes a phenyl radical substituted by from one to three halogen atoms such as bromine, iodine, chlorine and fluorine. The terms "loweralkyl" and "loweralkoxy" include alkyl and alkoxy radicals containing from 1 to 4 carbon atoms, inclusive. These compounds possess both antiinflammatory and diuretic properties. When orally administered to animals at a dosage of one millimole per kilogram of body weight, the antiinflammatory effect is observed as a significant reduction in the effusive response to intrapeural injection of Evans Blue: carrageenin.

Compounds included within the scope of this invention can be prepared as shown below wherein R, $R_1$ and $R_2$ are as previously defined and $R_3$ is methyl or ethyl:

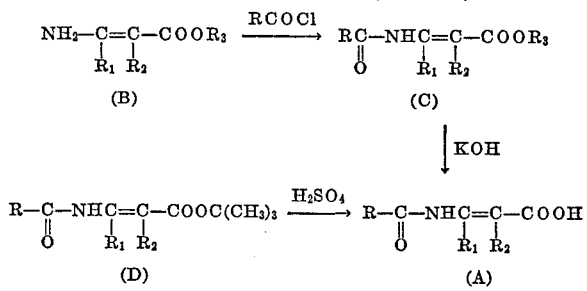

Thus, the esters of Formula B are acylated with an R-substituted acid chloride according to the known procedure described in Berichte, 42, 3912 (1910) to yield the β-arylamidoacrylate esters of Formula C which are carefully saponified with aqueous potassium hydroxide in isopropanol to produce the desired products of Formula A as crystalline solids soluble in alkali. Alternatively, the t-butyl esters of Formula D can be hydrolyzed by dissolving them in sulfuric acid and pouring the resulting solution over crushed ice to obtain the desired β-arylamidoacrylic acids. Specific embodiments of both procedures are set forth in the examples which follow.

PREFERRED EMBODIMENTS

Example 1

$R_1$ and $R_2$ are methyl and R is p-methoxyphenyl in Formula A.

A suspension of 35 grams (0.13 mole) of ethyl β-(p-methoxybenzoylamino)-α-methylcrotonate (melting at 97° C.) in 150 ml. of 66% aqueous isopropanol containing 8.65 grams (0.13 mole) of 85% potassium hydroxide was stirred at room temperature for 24 hours. The yellow solution which formed was filtered and diluted with 3 liters of hot water and 40 ml. of acetic acid. The precipitate was collected, dried and recrystallized from methanol to give 19 grams of β-(p-methoxybenzoylamino)-α-methylcrotonic acid as a white solid which melted at 150° C. and contained 5.53% nitrogen versus the calculated value of 5.62% nitrogen.

Example 2

$R_1$ is methyl, $R_2$ is hydrogen and R is 3,4-dichlorophenyl in Formula A.

A solution of 6.6 grams (0.02 mole) of t-butyl-β-(3,4-dichlorobenzoylamino)crotontae (melting point=102° C.) in 50 ml. of 98% sulfuric acid was allowed to stand for 3 hours at room temperature and then poured over crushed ice. The solid which formed was collected, dried and suspended in one liter of boiling water for 5 minutes, then cooled and filtered. Upon recrystallization from benzene, there was obtained 0.6 gram of β-(3,4-dichlorobenzoylamino) crotonic acid as a white solid with a melting point of 167° C. This compound analyzed 5.20% nitrogen compared to 5.11% nitrogen calculated.

Example 3

$R_1$ is phenyl, $R_2$ is hydrogen and R is phenyl in Formula A.

A solution of 27 grams (0.092 mole) of ethyl β-benzamidocinnamate (B.P.=195° C. at 0.5 mm. pressure) in 300 ml. of 66% aqueous isopropanol containing 6 grams of 85% potassium hydroxide was stirred for 24 hours at room temperature. The isopropanol was then removed under vacuum and the residue diluted with water. The insoluble material which formed was filtered and the filtrate acidified to produce the desired β-benzamidocinnamic acid as a white solid melting at 152° C. The yield was 14 grams or 57% of theory. Upon analysis, the acid product was found to contain 5.02% nitrogen compared to the calculated value of 5.24% nitrogen.

Examples 4–14

By following the saponification procedure described in Example 1, other compounds of Formula A were prepared in which $R_1$ was always methyl, $R_2$ was always hydrogen and R was as shown in the table below:

| Ex. No. | R | M.P., °C. | Percent nitrogen Calc. | Percent nitrogen Found | Percent yield |
| --- | --- | --- | --- | --- | --- |
| 4 | 4-fluorophenyl | 155 | 6.28 | 6.18 | 35 |
| 5 | 3-chlorophenyl | 146 | 5.84 | 5.72 | 23 |
| 6 | 4-chlorophenyl | 149 | 5.84 | 6.06 | 5 |
| 7 | 4-bromophenyl | 164 | 4.93 | 4.84 | 7 |
| 8 | 4-methylphenyl | 150 | 6.39 | 6.29 | 37 |
| 9 | 4-ethylphenyl | 111 | 6.00 | 5.82 | 11 |
| 10 | 4-isopropylphenyl | 114 | 5.67 | 5.77 | 12 |
| 11 | 4-t-butylphenyl | 136 | 5.36 | 5.21 | 15 |
| 12 | 4-cyanophenyl | 177 | 12.17 | 12.21 | 2 |
| 13 | 4-methoxyphenyl | 147 | 5.95 | 5.71 | 13 |
| 14 | 4-dimethylaminophenyl | 142 | 11.28 | 11.32 | 37 |

The starting crotonate esters employed in the foregoing examples were as follows:

| Example number | Starting crotonate ester | M.P., °C. |
| --- | --- | --- |
| 4 | Ethyl β-(4-fluorobenzamido)- | 102 |
| 5 | Methyl β-(3-chlorobenzamido)- | 87 |
| 6 | Methyl β-(4-chlorobenzamido)- | 135 |
| 7 | Methyl β-(4-bromobenzamido)- | 168 |
| 8 | Ethyl β-(4-methylbenzamido)- | 66 |
| 9 | Methyl β-(4-ethylbenzamido)- | 153 |
| 10 | Methyl β-(4-isopropylbenzamido)- | 1 178 |
| 11 | Ethyl β-(4-t-butylbenzamido)- | 74 |
| 12 | Methyl β-(4-cyanobenzamido)- | 173 |
| 13 | Methyl β-(4-methoxybenzamido)- | 111 |
| 14 | Methyl β-(4-dimethylaminobenzamido)- | 117 |

1 B.P. at 1 mm.

Examples 15–24

In the same manner as that described in Example 1, still other compounds corresponding to Formula A were prepared in which $R_1$ and $R_2$ were always methyl and R in each example was varied as shown in the following table:

| Ex. No. | R | M.P., °C. | Percent nitrogen Calc. | Percent nitrogen Found | Percent yield |
|---|---|---|---|---|---|
| 15 | Phenyl | 155 | 6.39 | 6.25 | 47 |
| 16 | 4-chlorophenyl | 171 | 5.52 | 5.36 | 21 |
| 17 | 3,4-dichlorophenyl | 183 | 4.86 | 4.86 | 44 |
| 18 | 3-bromophenyl | 172 | 4.70 | 4.33 | 37 |
| 19 | 3,5-dibromophenyl | 182 | 3.72 | 3.75 | 22 |
| 20 | 3-iodophenyl | 171 | 4.06 | 4.05 | 52 |
| 21 | 4-iodophenyl | 184 | 4.06 | 4.10 | 57 |
| 22 | 4-pyridyl | 170 | 12.72 | 12.45 | 19 |
| 23 | 4-isopropylphenyl | 141 | 5.36 | 5.30 | 36 |
| 24 | 4-t-butylphenyl | 167 | 5.09 | 4.96 | 40 |

The starting α-methylcrotonate esters used in the previous examples were as follows:

| Example number | Starting α-methylcrotonate ester | M.P., °C. |
|---|---|---|
| 15 | Ethyl β-benzamido- | 96 |
| 16 | Ethyl β-(4-chlorobenzamido)- | 128 |
| 17 | Ethyl β-(3,4-dichlorobenzamido)- | 146 |
| 18 | Ethyl β-(3-bromobenzamido)- | 105 |
| 19 | Ethyl β-(3,5-dibromobenzamido)- | 99 |
| 20 | Ethyl β-(3-iodobenzamido)- | 105 |
| 21 | Ethyl β-(4-iodobenzamido)- | 128 |
| 22 | Ethyl β-isonicotinoyl- | 139 |
| 23 | Ethyl β-(4-isopropylbenzamido)- | 61 |
| 24 | Ethyl β-(4-t-butylbenzamido)- | 92 |

EXAMPLES 25–27

By saponifying ethyl β-benzamido-α-ethylcrotonate (melting at 75° C.) as shown in Example 1, the compound of Formula A wherein $R_1$ was methyl, $R_2$ was ethyl and R was phenyl was readily obtained in 37% yield as a crystalline solid with a melting point of 127° C. and a nitrogen content of 5.97% compared to 6.01% nitrogen calculated.

Similarly, the saponification of ethyl β-(4-bromobenzamido)-α-ethylcrotonate (melting point=83° C.) with aqueous KOH in isopropanol produced a 5% yield of the compound of Formula A in which $R_1$ was methyl, $R_2$ was ethyl and R was 4-bromophenyl. Said compound melted at 150° C. and contained 4.40% nitrogen whereas the calculated value was 4.49% nitrogen.

Likewise, saponification of ethyl α-ethyl-β-(4-isopropylbenzamido)crotonate produced a 33% yield of the compound of Formula A wherein $R_1$ was methyl, $R_2$ was ethyl and R was 4-isopropylphenyl which melted at 112° C. and upon analysis was found to contain 5.04% nitrogen compared to 5.09% nitrogen calculated.

By substituting the appropriate esters of Formula C wherein $R_1$ and $R_2$ are propyl or butyl, $R_3$ is methyl or ethyl and R is 2,4,5-trichlorophenyl, 4-n-butylphenyl, 4-n-propoxyphenyl or 4-diethylaminophenyl and saponifying said esters as shown in Example 1, the corresponding acids of Formula A are obtained in which $R_1$, $R_2$ and R represent the radicals designated.

What is claimed is:
1. A compound of the formula

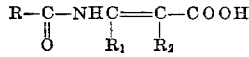

in which:

$R_1$ is a member of the group consisting of lower alkyl and phenyl;

$R_2$ is a member of the group consisting of hydrogen and lower alkyl;

R is a member of the group consisting of phenyl, monohalophenyl, dihalophenyl, loweralkylphenyl, loweralkoxyphenyl, diloweralkylaminophenyl; and wherein "loweralkyl" and "loweralkoxy" signify from one to four carbon atoms as applied to R, $R_1$, and $R_2$.

2. A compound as in claim 1: ethyl β-(4-fluorobenzamido)crotonic acid.

3. A compound as in claim 1: methyl β-(3-chlorobenzamido)crotonic acid.

4. A compound as in claim 1: methyl β-(4-chlorobenzamido)crotonic acid.

5. A compound as in claim 1: t-butyl β-(3,4-dichlorobenzamido)crotonic acid.

6. A compound as in claim 1: methyl β-(4-bromobenzamido)crotonic acid.

7. A compound as in claim 1: ethyl β-(4-methylbenzamido)crotonic acid.

8. A compound as in claim 1: methyl β-(4-ethylbenzamido)crotonic acid.

9. A compound as in claim 1: methyl β-(4-isopropylbenzamido)crotonic acid.

10. A compound as in claim 1: ethyl β-(4-t-butylbenzamido)crotonic acid.

11. A compound as in claim 1: methyl β-(4-methoxybenzamido)crotonic acid.

12. A compound as in claim 1: methyl β-(4-dimethylaminobenzamido)crotonic acid.

13. A compound as in claim 1: ethyl β-benzamido-α-methylcrotonic acid.

14. A compound as in claim 1: ethyl β-(4-chlorobenzamido)-α-methylcrotonic acid.

15. A compound as in claim 1: ethyl β-(3,4-dichlorobenzamido)-α-methylcrotonic acid.

16. A compound as in claim 1: ethyl β-(3-bromobenzamido)-α-methylcrotonic acid.

17. A compound as in claim 1: ethyl β-(3,5-dibromobenzamide)-α-methylcrotonic acid.

18. A compound as in claim 1: ethyl β-(3-iodobenzamido)α-methylcrotonic acid.

19. A compound as in claim 1: ethyl β-(4-iodobenzamido)-α-methylcrotonic acid.

20. A compound as in claim 1: ethyl β-(4-methoxybenzamido)-α-methylcrotonic acid.

21. A compound as in claim 1: ethyl β-(4-isopropylbenzamido)-α-methylcrotonic acid.

22. A compound as in claim 1: ethyl β-(4-t-butylbenzamido)-α-methylcrotonic acid.

23. A compound as in claim 1: ethyl β-benzamido-α-ethylcrotonic acid.

24. A compound as in claim 1: ethyl β-(4-bromobenzamido)-α-ethylcrotonic acid.

25. A compound as in claim 1: ethyl α-ethyl-β-(4-isopropylbenzamido)crotonic acid.

26. A compound as in claim 1: ethyl β-benzamidocinnamic acid.

27. A compound as in claim 1: methyl β-(3,4-dichlorobenzamido)crotonic acid.

References Cited

Royals, E. E.; Advanced Organic Chemistry (1961), pub. by Prentice-Hall, Inc. (QD251R68C16), p. 617 relied on.

LORRAINE A. WEINBERGER, Primary Examiner

L. A. THAXTON, Assistant Examiner

U.S. Cl. X.R.

260—295.5 R, 465 D, 518 A, 519; 424—263, 304, 319